(12) United States Patent
Rutschmann

(10) Patent No.: US 6,209,318 B1
(45) Date of Patent: Apr. 3, 2001

(54) EXHAUST GAS SYSTEM OF A MULTI-CYLINDER INTERNAL-COMBUSTION ENGINE

(75) Inventor: Erwin Rutschmann, Tiefenbronn (DE)

(73) Assignee: Porsche Aktiengesellschaft, Stuttgart (DE)

( * ) Notice: Subject to any disclaimer, the term of this patent is extended or adjusted under 35 U.S.C. 154(b) by 0 days.

(21) Appl. No.: 09/389,387

(22) Filed: Sep. 3, 1999

(30) Foreign Application Priority Data

Sep. 3, 1998 (DE) .............................. 198 40 096

(51) Int. Cl.$^7$ ...................................... F02B 27/02
(52) U.S. Cl. ................. 60/313; 60/312; 60/322; 60/324
(58) Field of Search .............. 60/313, 312, 322, 60/323, 324, 299, 302

(56) References Cited

U.S. PATENT DOCUMENTS

| | | | |
|---|---|---|---|
| 4,869,063 | * 9/1989 | Sakurai et al. | 60/313 |
| 4,926,635 | * 5/1990 | Sakuma | 60/299 |
| 5,072,583 | * 12/1991 | Urushihara et al. | 60/313 |
| 5,134,850 | * 8/1992 | Saito et al. | 60/313 |
| 5,216,883 | * 6/1993 | Flugger | 60/313 |

FOREIGN PATENT DOCUMENTS

| | | |
|---|---|---|
| 28 52 736 A1 | 6/1980 | (DE) . |
| 37 40 238 A1 | 6/1988 | (DE) . |
| 44 31 058 C1 | 8/1995 | (DE) . |

* cited by examiner

*Primary Examiner*—Thomas Denion
*Assistant Examiner*—Binh Tran
(74) *Attorney, Agent, or Firm*—Evenson, McKeown, Edwards & Lehahah, P.L.L.C.

(57) ABSTRACT

An exhaust gas system of a multi-cylinder internal-combustion engine has two groups of cylinders and one exhaust pipe system respectively and has a connection pipe between the exhaust pipe systems which is arranged close to the engine and which is constructed as a resonance pipe. The connection pipe can be shut off and opened up as a function of at least one operating parameter of the internal-combustion engine. By way of this connection pipe serving as the resonance pipe, resonance vibrations can be generated between the two exhaust pipe systems as a function of the ignition sequence and the rotational speed of the internal-combustion engine. Should these resonance effects cause a deterioration in the course in the torque as a function of the rotational speed, the switching flap is closed. When a positive effect is caused, the switching flap is opened up.

12 Claims, 2 Drawing Sheets

EXHAUST GAS SYSTEM OF A MULTI-CYLINDER INTERNAL-COMBUSTION ENGINE

BACKGROUND AND SUMMARY OF THE INVENTION

This application claims the priority of prior German application no. 198 40 096.9, filed Sep. 3, 1998, the entire disclosure of which is hereby incorporated by reference.

This invention relates to an exhaust gas system of a multi-cylinder internal-combustion engine. An exhaust gas system of this type includes two groups of cylinders including exhaust pipe systems, at least one catalyst element respectively arranged in each of the exhaust pipe systems, and at least one connection pipe between the exhaust pipe systems.

One such exhaust gas system is known, for example, from German Patent Document DE 37 40 238 A1. The internal-combustion engine described in this document has two groups of cylinders, each of which has an exhaust pipe system with a catalyst element. The two exhaust pipe systems are mutually coupled by one connection pipe respectively by which action upon the catalyst is to be made uniform. In an exhaust gas system of this type, as a function of the firing sequence and the rotational speed, unfavorable pressure courses or pressure rises may occur in the interaction of the individual emission cycles of the cylinders.

It is one object of the invention to largely exclude or compensate for the occurrence of mutually negatively influencing emission cycles of the individual cylinders combined in groups in order to achieve a torque level which is higher as a whole.

According to the invention, this object is achieved along with others by arranging the connection pipe close to the engine and constructing it as a resonance pipe. The connection pipe is provided with a shut-off element by which the resonance connection can be shut-off and opened up as a function of at least one operating parameter of the internal-combustion engine. By arranging the connection pipe close to the engine between the two exhaust pipe systems, a resonance vibration, which influences the pressure courses in the individual exhaust pipe systems, can form between the pipe systems. The effect of forming this resonance vibration is very much a function of the rotational speed. By arranging a shut-off flap in the resonance pipe, a negative effect can be prevented by eliminating the resonance effect. Simultaneously, when the shut-off flap is open, in the defined rotational speed ranges, the resonance effect is promoted.

If the catalyst elements of the individual exhaust pipe systems are arranged close to the engine, the connection pipe can advantageously be arranged behind these elements. In this case, the exhaust mouths of the catalyst elements can advantageously be utilized as an inlet and an outlet of the connection pipe.

The connection pipe between the two exhaust pipe systems is advantageously arranged such that, in the area of the connection points, the exhaust gas flow takes place essentially in a straight line so that a largely unrammed or unthrottled flow takes place and a correspondingly good resonance effect can therefore be achieved.

If the connection pipe between the two exhaust pipe systems is in each case connected with the exhaust mouth of the catalyst elements, the catalyst elements are advantageously arranged facing one another so that their axes are aligned or at least extend in parallel. As a result, a largely linear arrangement of the connection pipe is possible and a flow deflection in the transition area between the connection pipe and the exhaust pipe is avoided.

A particularly good course of the torque of a multi-cylinder internal-combustion engine provided with such an exhaust gas system is achieved when the shut-off flap in the connection pipe is controlled as a function of the rotational speed of the internal-combustion engine and the shut-off flap blocks the connection pipe below a rotational limit speed $n_G$ and opens the pipe above the rotational limit speed $n_G$.

A particularly good resonance effect by way of the connection pipe is achieved if the diameter of the connection pipe corresponds essentially to the diameter of the connected exhaust pipes.

Additional advantages and advantageous further developments of the invention are also described and claimed.

BRIEF DESCRIPTION OF THE DRAWINGS

An embodiment of the invention is explained in detail in the following description and is shown in the drawings.

DESCRIPTION OF THE PREFERRED EMBODIMENT

Figure 1:
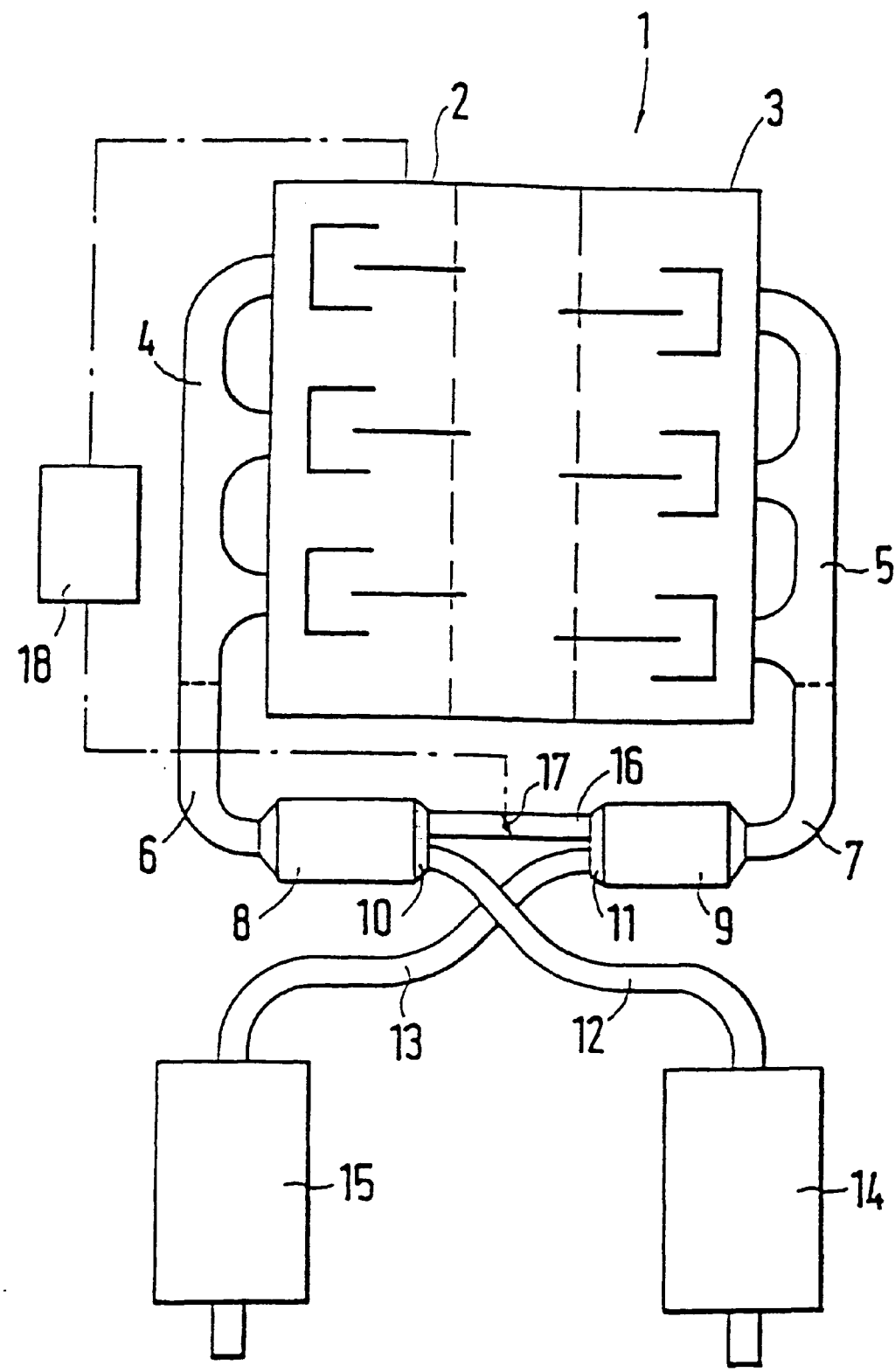
FIG. 1 is a schematic representation of an internal-combustion engine having an exhaust gas system according to the invention.

By way of example only and not in any way limiting the preferred embodiment, an internal-combustion engine is schematically illustrated in FIG. 1 as a six-cylinder horizontally opposed engine. The engine could include a greater or smaller number of cylinders. A construction with an arrangement of the cylinders in rows or in a V-shape is also easily possible. The two cylinder banks 2, 3 of the internal-combustion engine 1 are combined in groups. Each of the two cylinder banks 2, 3 is equipped on the outlet side with exhaust gas manifold 4, 5. Each of the two exhaust gas manifolds 4, 5 is connected by way of an exhaust pipe 6, 7 with a catalyst element 8, 9. The catalyst elements 8 and 9 are arranged such that their longitudinal axes are essentially aligned with one another and their outlet sides face one another. From the exhaust mouth 10, 11 of each of the two catalyst elements 8, 9, a pipe 12, 13 branches off which leads to a muffler 14, 15.

Between the exhaust mouths 10, 11 of the two catalyst elements 8, 9, a connection pipe 16 is arranged which contains a shut-off flap 17. The connection pipe 16 can be shut off and opened up by this shut-off flap as a function of the switching position. The shut-off flap 17 is operated by way of an adjusting device which is not shown in detail and which is connected with the engine control unit 18. As a result, the shut-off flap 17 can be controlled as a function of defined operating parameters of the internal-combustion engine.

Figure 2:
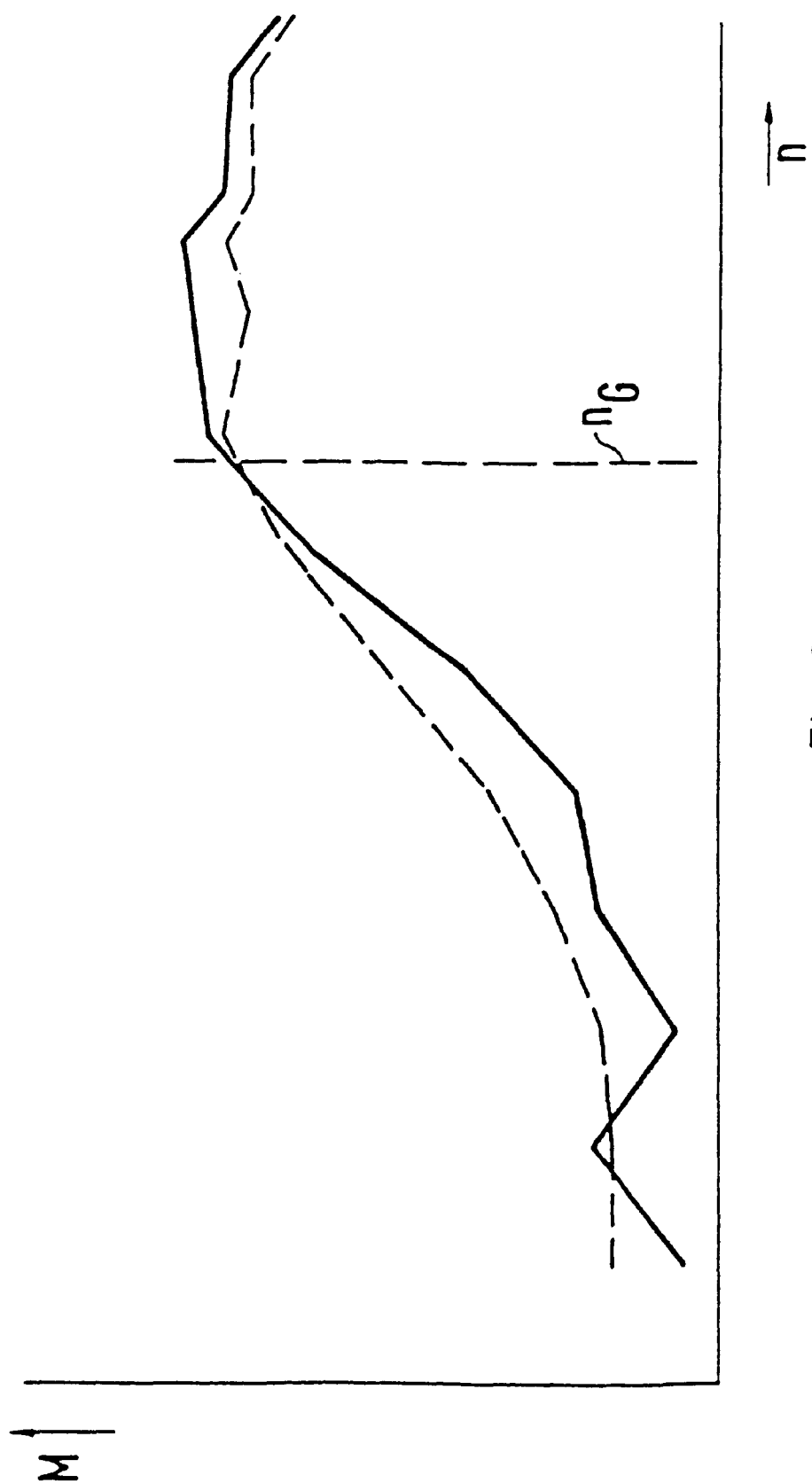
FIG. 2 is a rotational speed—torque diagram of an internal-combustion engine having an exhaust gas system according to the invention.

As an example, FIG. 2 illustrates a so-called full-load curve of an internal-combustion engine having an exhaust gas system according to the invention. The solid curve shows the rotational speed - torque course or relationship when the shut-off flap 17 is open, and the broken line shows the corresponding relationship when the shut-off flap 17 is closed. The two curves intersect in the range of a rotational limit speed nG Below this rotational limit speed $n_G$ ($n<n_G$), the achievable torque is higher at a defined rotational speed if the shut-off flap 17 is closed. Above this rotational limit speed $n_G$ ($n>n_G$), the torque which can be reached as a function of the rotational speed is higher if the shut-off flap 17 is opened up. An optimal rotational speed—torque relationship is therefore provided if the shut-off flap is closed below the rotational limit speed nG and opened above this rotational limit speed $n_G$.

The foregoing disclosure has been set forth merely to illustrate the invention and is not intended to be limiting. Since modifications of the disclosed embodiment incorporating the spirit and substance of the invention may occur to persons skilled in the art, the invention should be construed to include everything within the scope of the appended claims and equivalents thereof.

What is claimed is:

1. Exhaust gas system of a multi-cylinder internal-combustion engine having two groups of cylinders comprising:

exhaust pipe systems, at least one catalyst element respectively arranged in each of said exhaust pipe systems, and at least one connection pipe between the exhaust pipe systems, wherein the connection pipe is arranged close to the engine and is constructed as a resonance pipe, wherein the connection pipe is provided with a shut-off element by which the resonance pipe is adapted to be shut-off and opened up as a function of at least one operating parameter of the internal-combustion engine, wherein each catalyst element is arranged, in a flow direction of the exhaust gases, in front of the connection pipe, and wherein the connection pipe extends from and leads into exhaust mouths of the catalyst elements.

2. The exhaust gas system according to claim 1, wherein exhaust mouths of the catalyst elements face one another, and wherein the connection pipe extends essentially in a straight line.

3. The exhaust gas system according to claim 2, wherein the shut-off element is controlled as a function of rotational speed of the internal-combustion engine, and wherein the shut-off element shuts off the connection pipe below a rotational limit speed ($n_G$) and opens it up above the rotational limit speed ($n_G$).

4. The exhaust gas system according to claim 3, wherein the connection pipe has a diameter which essentially corresponds to a diameter of connected exhaust pipes of said exhaust pipe systems.

5. The exhaust gas system according to claim 2, wherein the connection pipe has a diameter which essentially corresponds to a diameter of connected exhaust pipes of said exhaust pipe systems.

6. The exhaust gas system according to claim 1, wherein the shut-off element is controlled as a function of rotational speed of the internal-combustion engine, and wherein the shut-off element shuts off the connection pipe below a rotational limit speed ($n_G$) and opens it up above the rotational limit speed ($n_G$).

7. The exhaust gas system according to claim 6, wherein the connection pipe has a diameter which essentially corresponds to a diameter of connected exhaust pipes of said exhaust pipe systems.

8. The exhaust gas system according to claim 1, wherein the connection pipe has a diameter which essentially corresponds to a diameter of connected exhaust pipes of said exhaust pipe systems.

9. Exhaust gas system of a multi-cylinder internal-combustion engine having two groups of cylinders comprising:

exhaust pipe systems, at least one catalyst element respectively arranged in each of said exhaust pipe systems, and at least one connection pipe between the exhaust pipe systems, wherein the connection pipe is arranged close to the engine and is constructed as a resonance pipe, wherein the connection pipe is provided with a shut-off element by which the resonance pipe is adapted to be shut-off and opened up as a function of at least one operating parameter of the internal-combustion engine, wherein each catalyst element is arranged, in a flow direction of the exhaust cases, in front of the connection pipe, and wherein exhaust mouths of the catalyst elements face one another, and wherein the connection pipe extends essentially in a straight line.

10. The exhaust gas system according to claim 9, wherein the shut-off element is controlled as a function of rotational speed of the internal-combustion engine, and wherein the shut-off element shuts off the connection pipe below a rotational limit speed ($n_G$) and opens it up above the rotational limit speed ($n_G$).

11. The exhaust gas system according to claim 10, wherein the connection pipe has a diameter which essentially corresponds to a diameter of connected exhaust pipes of said exhaust pipe systems.

12. The exhaust gas system according to claim 9, wherein the connection pipe has a diameter which essentially corresponds to a diameter of connected exhaust pipes of said exhaust pipe systems.

* * * * *